United States Patent [19]

Klein et al.

[11] 3,784,936

[45] Jan. 8, 1974

[54] ELECTROMECHANICAL FILTER

[75] Inventors: Dagobert Klein, Ludwigsburg; Günter Schneider, Renningen, both of Germany

[73] Assignee: International Standard Electric Corporation, New York, N.Y.

[22] Filed: Dec. 29, 1972

[21] Appl. No.: 319,250

[30] Foreign Application Priority Data

Dec. 22, 1972 Germany .................. P 22 02 948.7

[52] U.S. Cl. .................... 333/71, 333/30 R, 333/72

[51] Int. Cl. .......................... H03h 9/10, H03h 9/26

[58] Field of Search ...................... 333/71, 72, 30 R, 333/30 M

[56] References Cited

UNITED STATES PATENTS 1,678,116 7/1928 Harrison ...................... 333/30 M X 3,028,564 4/1962 Tanaka et al. .................... 333/71 X

*Primary Examiner*—Rudolph V. Rolinec

*Assistant Examiner*—Marvin Nussbaum

*Attorney*—C. Cornell Remsen, Jr. et al.

[57] ABSTRACT

In this electromechanical filter arrangement having a plurality of resonators vibrating in the first flexural mode, with each coupled to the adjacent resonators at the antinodal line, acoustic coupling between resonators not adjacent to one another is prevented by means of partitions or walls between each resonator or between a group of resonators and the adjacent group. The partitions are mounted on the inside of the filter cover or on the filter base plate.

5 Claims, 10 Drawing Figures

ELECTROMECHANICAL FILTER

The present invention relates to an electromechanical filter comprising a plurality of mechanically coupled resonators viabrating in a flexural mode.

Figure 1B:
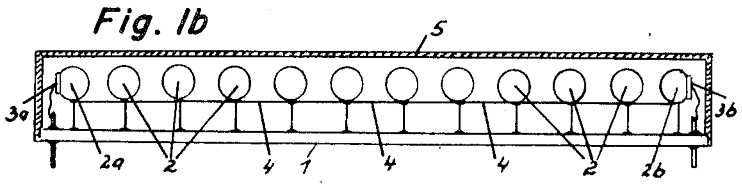
Figure 1A:
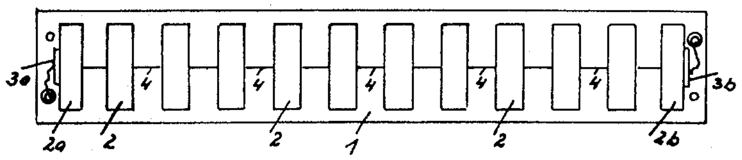

Electromechanical filters are being used more and more because, in the suitable frequency band, they are superior to filters made up of coils and capacitors thanks to the high Q of the resonators, the high stability of their values, and their low space requirement. For special applications such as for carrier-frequency telephone transmission equipment, electromechanical filters are known which consist of a plurality of coupled resonators vibrating in a flexural mode. Such an electromechanical filter is described, for example, in German Pat. No. 1,100,834, where a plurality of rod-shaped resonators of rectangular, circular, or elliptic cross section are arranged one behind the other with parallel long sides, the individual resonators being coupled with the respective adjacent ones through one or more coupling wires or coupling strips. In such electromechanical filters, the resonators are usually secured to a base plate, and the filter is covered with a protecting cap protecting it against mechanical damage and dust accumulation. FIG. 1*a* shows a top view of such a filter without protecting cap, and FIGS. 1*b* and 1 *c* are side views with the protecting cap outlined in section.

FIG. 1*a* is a top view of such an electromechanical filter. Designated 1 is the base plate, to which the resonators 2 are secured. 2*a* and 2*b* are the chain's two final resonators, to which are attached, respectively, the electromechanical transducer 3*a* and the mechanoelectrical transducer 3*b*, which may be made of piezoceramics. Designated 4 is the coupling wire, which couples the individual resonators together. The protecting cap 5 (not shown) is then slipped over this electromechanical filter and protects it against damage and dust accumulation. FIG. 1*b* is a side view of the long side, and FIG. 1*c* a side view of the transverse side of this filter. In these figures, the protecting cap 5 is outlined in section.

Figure 2:
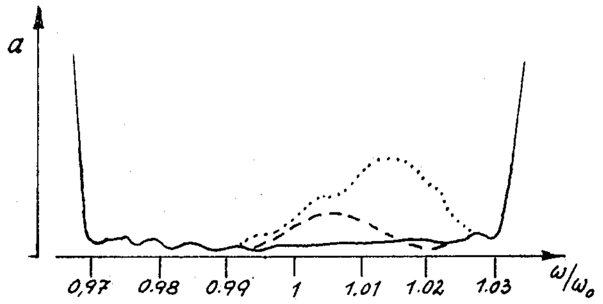

The resonators of electromechanical filters, and particularly flexural resonators, however, also excite the surrounding air in its oscillation frequency, thus causing acoustic waves which originate from their surfaces and strike and influence mainly the adjacent resonator. However, mechanical coupling between adjacent resonators is so close that acoustic coupling via the air can practically be neglected completely. The fact is different with resonators not adjacent to one another. Between these resonators, mechanical coupling is practically zero, so that any incidence of acoustic waves radiated from a resonator on another, nonadjacent resonator results in undesirable bypass coupling if the intensity of the acoustic waves exceeds a permissible limit, thus being able to excite this resonator in such a manner that the transmission characteristics of the filter as resulting from purely mechanical wave propagation are unduly changed. If there are no reflecting surfaces such as base plate or protecting cap, the respective next resonator is in the sound shadow of the previous one, with the influences of sound diffraction decreasing with increasing frequency. If, however, such reflecting surfaces in the form of the base plate and a protecting cap are present, the acoustic waves radiated from the resonators are reflected from these surfaces, so that nonadjacent resonators, too, are now struck and excited by these waves, with the exciting energy and, consequently, bypass coupling increasing as the distance between resonator and reflecting surface decreases. FIG. 2 shows the influence of such bypass couplings on an electromechanical filter vibrating in a flexural mode in the 50-kHz range, with the passband characteristic without bypass coupling shown as a solid line, while the characteristics with bypass coupling are shown, respectively, as a broken line and dotted.

One possibility of eliminating the influence of such bypass couplings would be to make the distance from the resonators to the base plate and the protecting cap as large as possible, particularly because any remaining influence of bypass couplings could then be taken into account in the design of the filter. Since, however, the present tendency is towards miniaturization and such electromechanical filters are mounted on printed circuit boards which are placed side by side or one upon the other, the height of such a filter should not exceed that of the other components used on such circuit boards. At present, this measure is about 10 mm, so that a sufficient distance from the resonators to the base plate and/or protecting cap cannot be realized.

It is therefore the object of the present invention to provide, for an electromechanical filter comprising a plurality of mechanically coupled resonators vibrating in a flexural mode, the individual resonators being secured to a base plate and the filter, if necessary, being covered with a protecting cap protecting it against mechanical damage and dust accumulation, an arrangement for preventing or reducing acoustic bypass couplings which permits said filter to be realized with a sufficiently low overall height.

The invention is characterized in that between the individual resonators or between groups of two or more resonators there are provided partitions whereby any acoustic bypass coupling is prevented or reduced to a negligible value.

As further aspects of the invention, teachings for the design of these partitions are given.

The invention will now be described in detail with reference to FIGS. 3 to 5. Of the above-described FIGS. 1a, 1b, 1c and 2, FIGS. 1*a* 1*b*, 1*c* are a top view and side views of an electromechanical filter with flexural resonators, and FIG. 2 shows the transfer characteristic of such a filter with and without protecting cap.

Figure 3A:
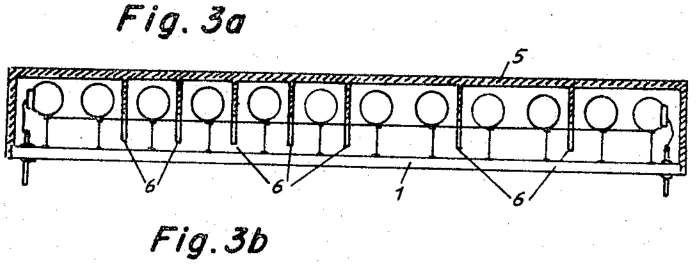
Figure 3B:
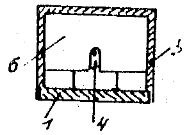
Figure 4A:
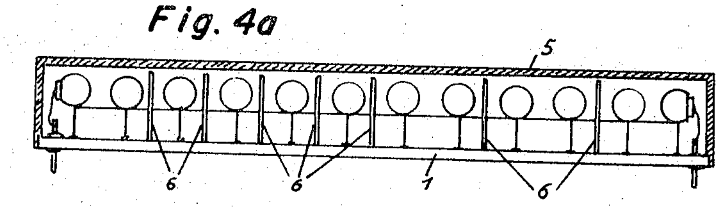
Figure 4B:
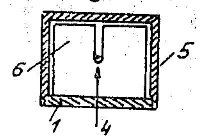
Figure 5A:
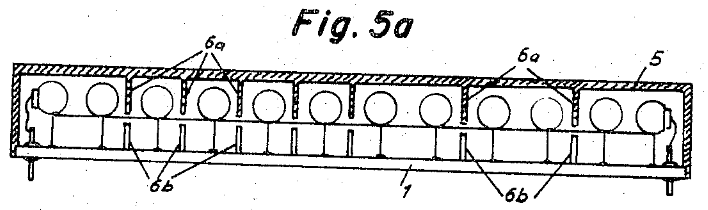
Figure 5B:
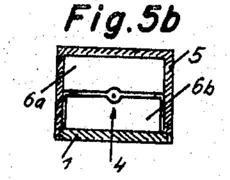

Of FIGS. 3 to 5,

FIGS. 3*a* and 3*b* are a side and a cross-sectional view of the inventive arrangement in which the partitions are mounted to the protecting cap;

FIGS. 4*a* and 4*b* show the inventive arrangement in which the partitions are mounted on the base plate, FIGS. 5*a* and 5*b* show the inventive arrangement in which the partitions are divided, with the individual parts attached to the base plate and the protecting cap.

Figure 1C:
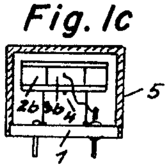

In FIGS. 3 to 5, the same reference characters are used as in FIGS. 1*a*, 1*b*, and 1*c*. In the inventive arrangement shown in FIG. 3*a* in a side view, partitions 6 are provided at the protecting cap 5 between each resonator 2 or between groups of two or more resonators 2, which partitions prevent the acoustic waves radiated by a resonator from reaching the adjacent resonator or a nonadjacent one direct. Since the mechanical coupling through the coupling wire 4 between nonadjacent resonators tends toward zero, any appreciable additional acoustic bypass coupling would result in attenuation drops as are shown in FIG. 2 for a 50-kHz bandpass filter. This partition 6 is shown in FIG. 3*b* in a section through such a mechanical filter between a resonator 2 and an adjacent partition 6. A slot(not designated) is provided for the coupling wire 4. The height of the partition 6, i.e., the question as to whether the partition extends over the whole cross section of the filter or only over part of it, depends on the conditions resulting from the respective construction and on the requirements imposed on the filter characteristic. If, for example, the distance between resonators 2 and protecting cap 5 is small compared to the distance between resonators 2 and base plate 1, it will frequently be sufficient — as practical application has shown — if the partitions 6 extend only about down to the level of the coupling wire 4, provided that the base plate 1 is suitably designed. If the protecting cap 5 itself is made of plastic by injection molding, the partitions 6 may be simultaneously molded in one operation, in which case the injection tool need not have any complicated devices such as slides because the partitions extend perpendicularly to the top of the protecting cap.

An alternative to the solution shown in FIGS. 3*a* and 3*b* is illustrated in FIGS. 4*a* and 4*b*. Here, the partitions 6 are mounted on the base plate 1 and must extend across the entire cross-sectional area except for the narrow slot for the coupling wire 4.

A combination of both possibilities is shown in FIGS. 5*a* and 5*b*. Here, the partitions 6 are divided into two parts, one of which (6*a*) is attached to the protecting cap 5, while the other (6*b*) is mounted on the base plate 1.

As shown in the foregoing, the inventive arrangement provides a simple possibility of preventing any acoustic bypass coupling in an electromechanical filter of the type described or of reducing such bypass coupling so that its effect on the filter characteristic becomes negligibly small. The means used therefor can be easily manufactured even by automatic mass production and involve no additional expense of any weight.

What is claimed is:

1. An electromechanical filter comprising a plurality of mechanically coupled resonators vibrating in a flexural mode, the individual resonators being secured to a base plate, wherein between the individual resonators or between groups of at least two resonators there are provided partitions for substantially preventing acoustic bypass coupling.

2. The electromechanical filter according to claim 1 wherein said filter further includes a protecting cap, and wherein the partitions are mounted to the protecting cap.

3. The electromechanical filter according to claim 1 wherein the partitions are mounted on the base plate.

4. The electromechanical filter according to claim 2 wherein the partitions are divided, such that one part is attached to the protecting cap, while the other is mounted on the base plate.

5. The electromechanical filter according to claim 2 wherein the protecting cap and the partitions attached to the protecting cap are made as a single plastic unit.

* * * * *